(12) United States Patent
Jeffries (10) Patent No.: US 11,466,487 B2
(45) Date of Patent: Oct. 11, 2022

(54) HINGED DOOR WITH LATCH

(71) Applicant: Austin Hardware & Supply, Inc., Lee's Summit, MO (US)

(72) Inventor: Mark Steven Jeffries, Buford, GA (US)

(73) Assignee: Austin Hardware & Supply, Inc., Lee's Summit, MO (US)

( * ) Notice: Subject to any disclaimer, the term of this patent is extended or adjusted under 35 U.S.C. 154(b) by 856 days.

(21) Appl. No.: 15/905,955

(22) Filed: Feb. 27, 2018

(65) Prior Publication Data

US 2018/0245383 A1  Aug. 30, 2018

Related U.S. Application Data

(60) Provisional application No. 62/464,700, filed on Feb. 28, 2017.

(51) Int. Cl.
*E05C 3/00* (2006.01)
*E05C 3/14* (2006.01)
(Continued)

(52) U.S. Cl.
CPC ............. *E05C 3/008* (2013.01); *B60R 7/04* (2013.01); *E05C 3/14* (2013.01); *E05D 1/02* (2013.01);
(Continued)

(58) Field of Classification Search
CPC ......... Y10T 292/0911; Y10T 292/0926; Y10T 292/0934; Y10T 292/0951; Y10T 292/0952; Y10T 292/0953; Y10T 292/0957; Y10T 292/0959; Y10T 292/1043; Y10T 292/1049; Y10T 292/1061; Y10T 292/1083; Y10T 292/1084; Y10T 292/1085;
(Continued)

(56) References Cited

U.S. PATENT DOCUMENTS 2,031,302 A * 2/1936 Clark .................. E05B 65/0057
292/128
2,523,727 A * 9/1950 Sevison .............. E05B 65/0835
292/128

(Continued)

FOREIGN PATENT DOCUMENTS

CA   2377805 A1 * 1/2001  ......... E05B 65/0835
CH    366770 A  * 1/1963  ............... E05C 3/14

OTHER PUBLICATIONS

Computer Generated Translation for CH 366770 A, Generated on May 3, 2021, https://worldwide.espacenet.com/ (Year: 2021).*

Primary Examiner — Alyson M Merlino
(74) Attorney, Agent, or Firm — Polsinelli PC (57) ABSTRACT

A hinged door with a latch described. The latch may be used to secure the door of a cabinet in a closed position. The door hingedly connects to the cabinet by a hinge. The latch includes a handle. The handle includes a pawl tip. The latch includes a base, and the handle rotates relative to the base. The handle is biased to a closed position by a spring or biasing member. The handle and the base are mounted to the door of the cabinet. A striker is mounted to a wall the cabinet. The striker includes a catch that is spaced from an interior side of a wall of the cabinet. The pawl tip of the handle lockingly engages with the catch of the striker to secure the door.

17 Claims, 10 Drawing Sheets

(51) Int. Cl.
*E05D 1/02* (2006.01)
*B60R 7/04* (2006.01)
*E05D 3/02* (2006.01)
*E05B 65/44* (2006.01)
*E05B 65/46* (2017.01)

(52) U.S. Cl.
CPC ............... *E05D 3/02* (2013.01); *E05B 65/44* (2013.01); *E05B 65/46* (2013.01); *E05Y 2900/20* (2013.01); *E05Y 2900/538* (2013.01)

(58) Field of Classification Search
CPC ......... Y10T 292/1091; Y10T 292/1092; Y10T 292/444; E05C 3/00; E05C 3/006; E05C 3/008; E05C 3/12; E05C 3/124; E05C 3/14; E05B 65/44; E05B 65/46; E05D 1/00; E05D 1/02; E05D 1/06
See application file for complete search history.

(56) References Cited

U.S. PATENT DOCUMENTS

| | | | | |
|---|---|---|---|---|
| 2,565,092 A * | 8/1951 | Reynaud | ............... | E05C 3/048 292/202 |
| 2,634,997 A * | 4/1953 | Gallowitz | ............... | E05C 3/14 292/128 |
| 2,710,212 A * | 6/1955 | Galen | ............... | E05C 3/14 292/128 |
| 2,737,407 A * | 3/1956 | Matthews | ............... | E05C 3/30 292/128 |
| 2,859,744 A * | 11/1958 | Hadley | ............... | E05C 3/14 126/197 |
| 3,161,923 A * | 12/1964 | Crain | ............... | E05B 65/0835 292/128 |
| 3,208,781 A * | 9/1965 | Appleberry | ............... | E05C 3/14 292/128 |
| 3,220,759 A * | 11/1965 | Miller | ............... | E05C 3/14 292/120 |
| 3,288,508 A * | 11/1966 | Maize | ............... | E05C 3/14 292/128 |
| 3,516,114 A * | 6/1970 | Joyce | ............... | E05D 3/12 16/225 |
| 3,709,538 A * | 1/1973 | Seitz | ............... | E05C 3/14 292/128 |
| 3,808,742 A * | 5/1974 | Ehret | ............... | E06B 1/62 49/413 |
| 3,893,261 A * | 7/1975 | Cribben | ............... | E05B 65/0835 292/128 |
| 3,984,135 A * | 10/1976 | Dathe | ............... | E05B 59/00 292/4 |
| 4,777,777 A * | 10/1988 | Massimo | ............... | E04B 1/6158 16/225 |
| 5,224,297 A * | 7/1993 | Watkins | ............... | E05B 65/0835 292/210 |
| 6,220,478 B1 * | 4/2001 | Ingerson | ............... | E05C 3/14 220/326 |
| 6,378,172 B1 * | 4/2002 | Schrage | ............... | E05D 3/12 16/225 |
| 6,547,289 B1 * | 4/2003 | Greenheck | ............... | E05B 65/46 292/100 |
| 6,550,824 B1 * | 4/2003 | Ramsauer | ............... | E05B 65/0852 292/100 |
| 2004/0244435 A1 * | 12/2004 | Kim | ............... | D06F 39/14 68/12.26 |
| 2016/0194068 A1 * | 7/2016 | Savian | ............... | E05D 1/02 160/213 |
| 2018/0073290 A1 * | 3/2018 | Jeffries | ............... | E05D 15/08 |
| 2019/0277075 A1 * | 9/2019 | Jeffries | ............... | E05C 3/14 |

\* cited by examiner

HINGED DOOR WITH LATCH

CROSS REFERENCE TO RELATED APPLICATION

This application claims the benefit of U.S. Provisional Patent Application 62/464,700 filed Feb. 28, 2017, which is hereby incorporated by reference.

FIELD OF INVENTION

The present invention relates to a hinged door with a latch.

SUMMARY

A hinged door with a latch is described. The latch may be used to secure the door of a cabinet in a closed position. The door hingedly connects to the cabinet by a hinge. The door may cover an opening of the cabinet.

The hinged door and latch is well suited for use in cabinets on emergency vehicles, such as ambulance, fire trucks, etc. The cabinets may be used for storage on such vehicles. The door may be used to close the cabinets and prevent the contents of the cabinet from falling out of the cabinet. The latch secures the door in a closed position over the cabinet.

The latch includes a handle, a base, and a striker. The handle and base are mounted to the door, while the striker is mounted to the cabinet. The latch includes slam-closing functionality, i.e., pushing the door to a closed position engages the latch to secure the door in the closed position. The latch includes one-handed opening operation, i.e., the user may grip any portion of the handle with a single hand and actuate the handle to release the latch and permit the door to open. Further, the latch resists both inward and outward forces on the door to provide improved strength.

The latch incorporates an inverted pawl and catch design. Many conventional latches using a pawl and striker suffer from failure when an interior force is applied to the door. The conventional latches pull apart. In contrast, the present latch includes a unique inverted pawl and catch design that tightens when an interior force or load is applied. When an interior load is applied to the present hinged door, the door pulls its pawl directly into locking surfaces of the catch.

The handle pivots or rotates relative to the base. The handle is biased to a closed position by a biasing member. The base mounts directly to the door, and the handle is pivotally or rotatably mounted to the base.

The handle, the base, and the striker may be formed from metal extrusions that span much or all of a vertical length of the door. This greatly increases the stiffness of the door and the door's resistance to buckling forces.

The hinge may include a rubber connector that bends and flexes to provide the movement of the hinge. The hinge includes a wall attachment and a door attachment, which are joined by the rubber connector. The wall attachment connects to a wall of the cabinet and a wall side of the rubber connector. The door attachment connects to an edge of the door and a door side of the rubber connector.

In a closed position, a catch on the door attachment engages or interlocks with a striker on the wall attachment. The catch prevents the pulling apart or separation of the wall attachment and the door attachment when the panel is impacted from a back side (interior side).

The hinge provides an opening of up to 180 degrees or more depending on the installation and construction of the cabinet. The rubber connector may be formed natural or synthetic rubbers and elastomers.

In a closed position of the hinge, the wall attachment and the door attachment overlap. In a crash situation, where an object creates an outward impact load, the overlap of the wall attachment and the door attachment help to prevent or reduce outward movement of the door.

The wall attachment of the hinge mounts to an inside cabinet wall. This prevents fasteners from being installed on an end grain of a wood cabinet.

In one aspect, a latch for a door of a cabinet is described. The latch includes a handle. The handle includes a pawl tip. The latch includes a base. The handle rotates relative to the base. The handle is biased to a closed position by a spring. The handle and the base are configured to mount to a door of a cabinet. A striker is configured to mount to a wall of the cabinet. The striker includes a base portion and a catch. The catch is spaced from the base portion. The pawl tip lockingly engages with the catch of the striker.

In another aspect, a latch for a door of a cabinet is described. The latch includes a handle having a pawl arm approximately perpendicular to a pawl lever end. A distal end of the pawl arm includes a pawl tip. The latch includes a base. The handle rotates relative to the base. The handle is biased to a closed position by a spring. The handle and the base are configured to mount to a door of a cabinet. The latch includes a striker configured to mount to a wall of the cabinet. The striker includes a base portion and an extending portion. The extending portion transitions into a catch. The catch is spaced from the base portion. The spring urges against the pawl lever end and biases the pawl tip towards the striker. The pawl tip is configured to lockingly engage with the catch of the striker.

In another aspect, a cabinet is described. The cabinet includes a plurality of walls defining an interior with an opening. A door is engaged to a first wall of the plurality of walls by a hinge. The latch includes a handle with a pawl tip. The latch includes a base. The handle rotates relative to the base. The handle is biased to a closed position by a spring. The handle and the base are mounted to the door of the cabinet. A striker is mounted to a second wall of the plurality of walls. The striker includes a catch and a base portion. The catch is spaced from an interior surface of the second wall. The pawl tip lockingly engages with the catch of the striker.

In another aspect, a latch for a door of a cabinet is described. The latch includes a handle. The handle includes a pawl tip and a pawl lever end. The latch includes a base, and the handle rotates relative to the base. The handle is biased to a closed position by a spring or biasing member. The handle and the base are mounted to a door of the cabinet. A striker is mounted to a wall the cabinet. The striker includes a catch that is spaced from an interior surface of the wall of the cabinet. The pawl tip of the handle lockingly engages with the catch of the striker to secure the door.

In another aspect, a latch for a cabinet is described. The latch includes a handle. The handle includes a pawl arm approximately perpendicular to a pawl lever end. A distal end of the pawl arm includes a pawl tip. The latch includes a base, and the handle rotates relative to the base. The handle is biased to a closed position by a spring or other biasing member. The handle and the base are mounted to a door of the cabinet. A striker is mounted to a wall of the cabinet. The striker includes a base portion and an extending portion that extends from the base portion into an interior of the cabinet. The extending portion transitions into a catch. The catch is spaced from an interior surface of the wall of the cabinet. The pawl tip lockingly engages with the catch of the striker.

In another aspect, a hinge for a cabinet door is described. The hinge includes a wall attachment to engage with a wall of a cabinet. The wall attachment includes a first receiving portion and a striker. The hinge includes a door attachment to engage with a door of the cabinet. The door attachment includes a second receiving portion and a catch. The hinge includes a rubber connector that joins with the first receiving portion of the wall attachment and the second receiving portion of the door attachment. The rubber connector bends and flexes to provide the hinging movement. The striker engages to the catch when the hinge is closed.

In another aspect, a hinge for a cabinet door is described. The hinge includes a wall attachment that includes a front wall and a rear wall. The front wall and the rear wall defining a first receiving portion. The rear wall of the wall attachment includes a striker. The hinge includes a door attachment that includes a front wall and a rear wall. The front wall and the rear wall defining a second receiving portion. The rear wall of the door attachment includes a catch. A rubber connector joins the wall attachment and the door attachment. The rubber connector includes a wall side and a door side. The first receiving portion receives the wall side of the rubber connector and the second receiving portion receives the door side of the rubber connector. The rubber connector bends and flexes to provide the hinging movement. The striker engages the catch when the hinge is closed.

The hinged door with the latch is well suited for use in cabinets on emergency vehicles, such as ambulance, fire trucks, etc. The cabinets may be used for storage on such vehicles. The door may be used to close the cabinets and prevent the contents of the cabinet from falling out of the cabinet. The latch secures the door in a closed position over the cabinet.

DETAILED DESCRIPTION OF INVENTION

Figure 1:
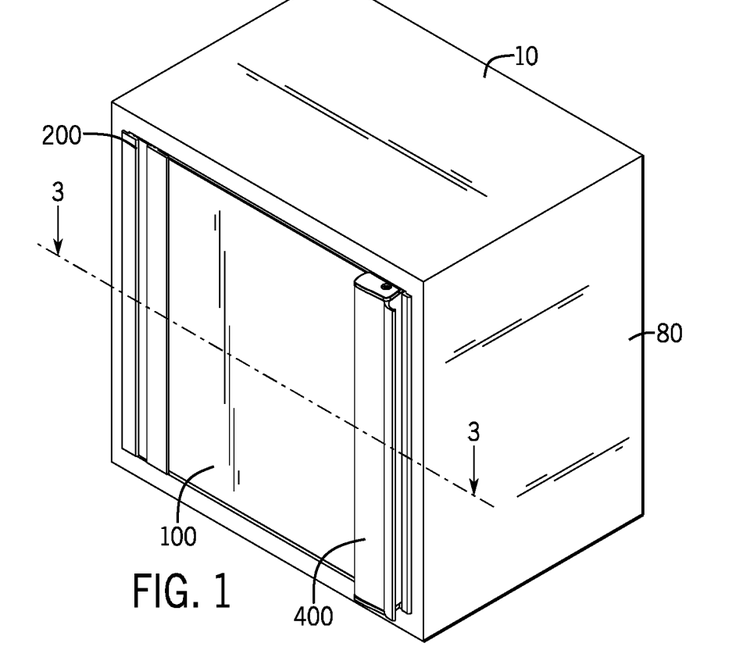
FIG. 1 is a perspective view of the door engaged to the cabinet via the hinge in a closed position.
Figure 2:
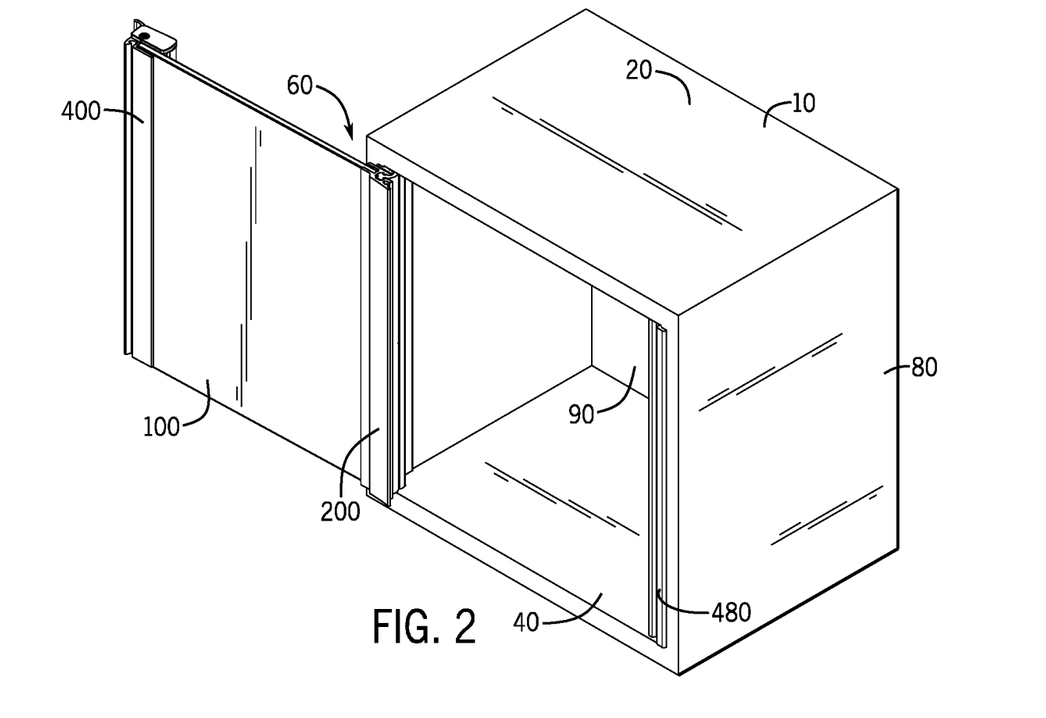
FIG. 2 is a perspective view of the door engaged to the cabinet via the hinge with the door in an open position.
Figures 3, 4, 5, 6:
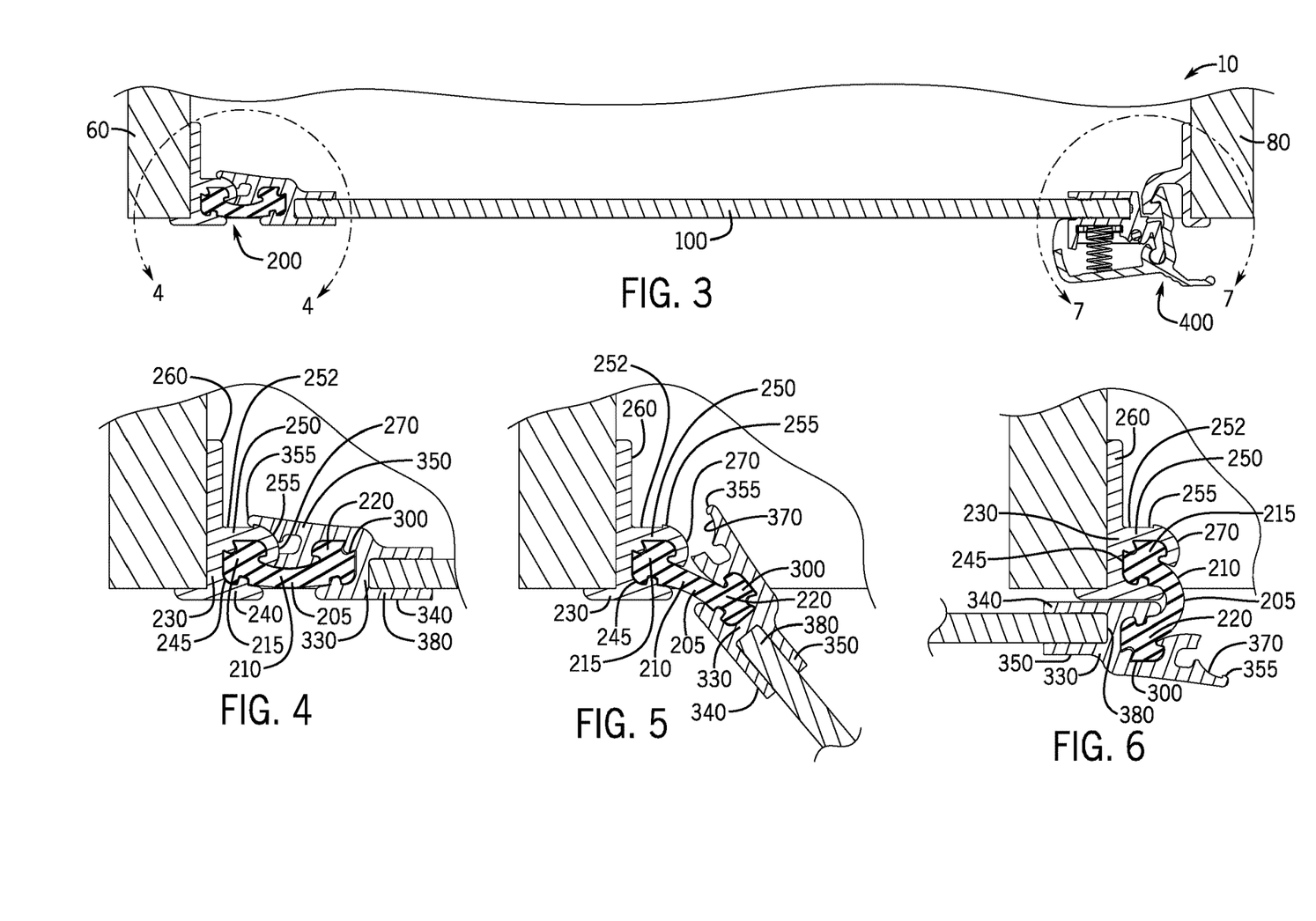
FIG. 3 is a sectional view of the door engaged to the cabinet via the hinge in the closed position.
FIG. 4 is a sectional view of the hinge in the closed position.
FIG. 5 is a sectional view of the hinge in the partially opened position.
FIG. 6 is a sectional view of the hinge in the fully opened position.

With reference to FIGS. 1 and 2, a cabinet 10 and a door 100 are shown. The door 100 hingedly engages to a front of the cabinet 10 via a hinge 200. A latch 400 secures the door 100 in a closed position. As described herein, the hinge 200 and the latch 400 include a robust design that provides strength and security. FIG. 3 shows a sectional view of the cabinet 10 with the door 100, hinge 200, and the latch 400. As described below, the door 100 may engage to the cabinet 10 by any of a variety of hinges, such as a hinge 600, shown in FIGS. 18-20.

The cabinet includes an upper wall 20 opposite of a lower wall 40 and a left side wall 60 opposite of a right side wall 80. The walls 20, 40, 60, and 80 may be fastened together with or without a rear wall 90. The door 100 may include conventional construction. The cabinet 10 may be formed to have a generally rectangular or square shape.

The hinge 200 provides for the door 100 to move between open and closed positions. In FIGS. 4-6, sectional views of the hinge 200 are shown as the hinge 200 moves from the closed position to the open position. The hinge 200 includes a rubber connector 205 that bends and flexes to provide the movement of the door 100. The hinge 200 includes a wall attachment 230 and a door attachment 330, which are joined by the rubber connector 205. The wall attachment 230 connects to a wall of the cabinet 10 and a wall side 215 of the rubber connector 205. The door attachment 330 connects to an edge of the door 100 and a door side 220 of the rubber connector 205.

The rubber connector 205 includes a central portion 210 positioned between the wall side 215 and the door side 220. The wall side 215 and the door side 220 of the rubber connector 205 may include a thicker or larger cross-section as compared to the central portion 210 of the rubber connector 205.

The wall attachment 230 includes a front wall 240 and a rear wall 250. The front wall 240 and the rear wall 250 extend inward from a base portion 260. The base portion 260 attaches to the wall of the cabinet 10. The front wall 240 and the rear wall 250 define a receiving portion 245 that receives and holds the wall side 215 of the rubber connector 205. The receiving portion 245 may include one or more recesses, chamfered edges, etc. to securely engage with the wall side 215 of the rubber connector 205. Likewise, the door attachment 330 defines a receiving portion 300 have matching or complementary shapes to the securely engage with the door side 220 of the rubber connector 205. The wall side 215 and the door side door side 220 of the of the rubber connector 205 may include one or more recesses, chamfered edges, etc. complementary or matching to the receiving portions 245 and 300.

A rear surface 252 of the rear wall 250 of the wall attachment 230 includes a striker 255 formed by a protrusion, bump, angle, etc. of the rear surface 252. The rear wall 250 further includes a curved portion 270. The curved portion 270 may form a convex surface. The striker 255 is positioned between the curved portion 270 and the base portion 260.

The door attachment 330 includes a front wall 340 and a rear wall 350. The rear wall 350 of the door attachment 330 overlaps the rear wall 250 of the wall attachment 230. The rear wall 350 of the door attachment 330 includes a catch 355 that engages or interlocks with the rear wall 250 of the wall attachment 230. The rear wall 350 may further include a concave front surface 370, which receives the curved portion 270 of the rear wall 250 when the door 100 is closed. The catch 355 of the rear wall 350 of the door attachment 330 may be formed adjacent to the concave front surface 370. The catch 355 may be formed on a front side of the rear wall 350. The front wall 340 and the rear wall 350 of the door attachment 330 also form the groove 380 to receive an edge of the door 100.

The rear wall 350 is generally longer than the front wall 340 to provide the overlap of the rear wall 350 to the rear wall 250. In a closed position, the catch 355 on the door attachment 330 engages or interlocks with the striker 255 on the wall attachment 230. The catch 355 prevents the pulling apart or separation of the wall attachment 230 and the door attachment 330 when the door 100 is impacted from a back side (interior side). The engagement between the striker 255 and the catch 355 assists in holding the wall attachment 230 and the door attachment 330 together under times of stress. When the door 100 is closed, the hinge 200 secures the door 100 at multiple points to improve strength and security.

Figure 7:
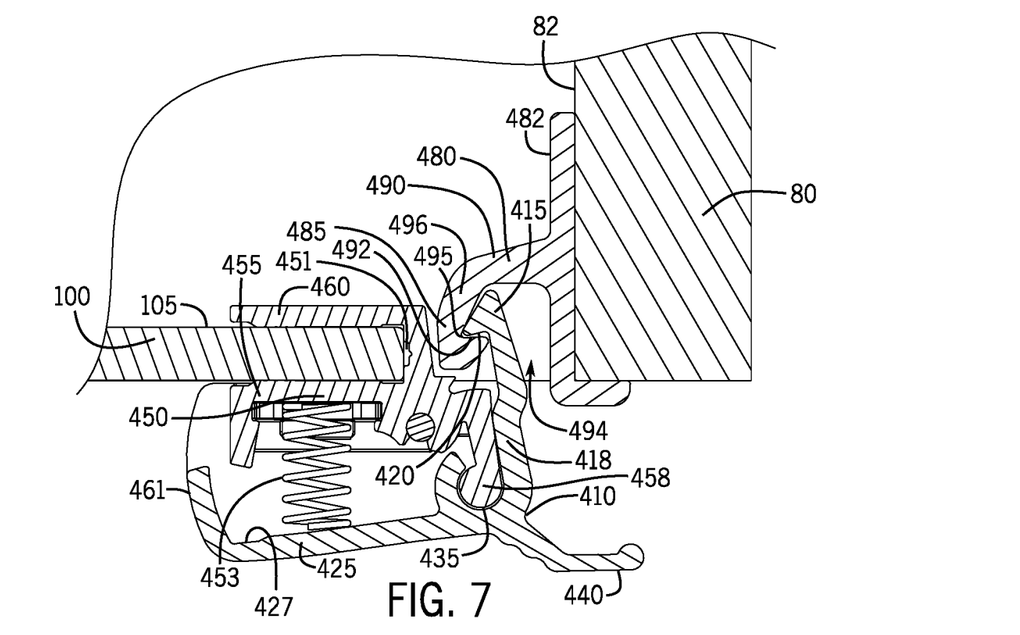
FIG. 7 is a sectional view of the latch in a latched position.
Figure 8:
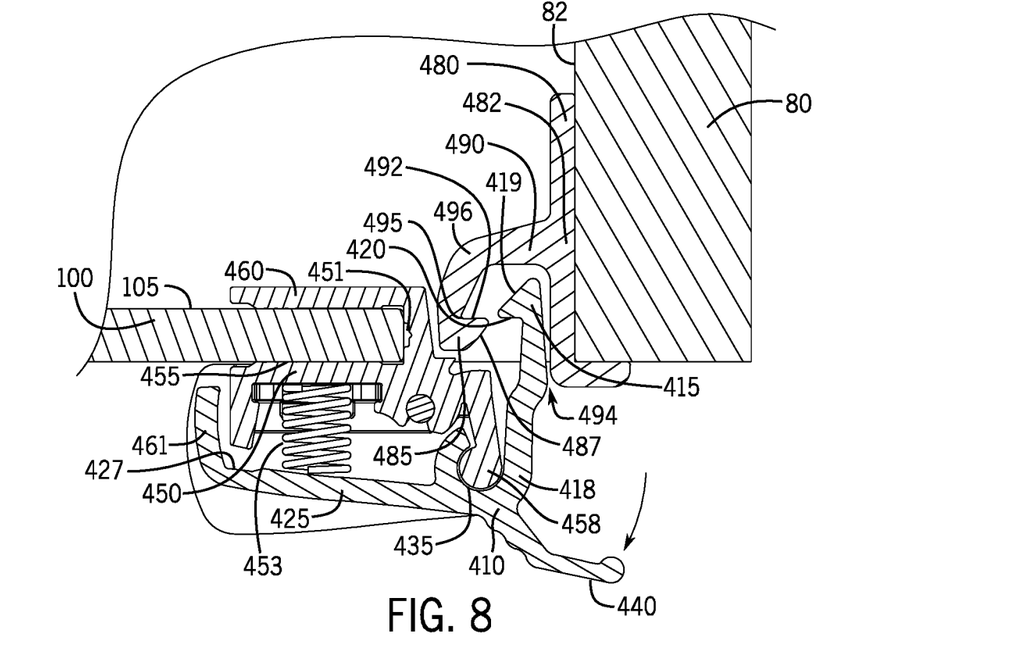
FIG. 8 is a sectional view of the latch in an unlatched position.
Figure 9:
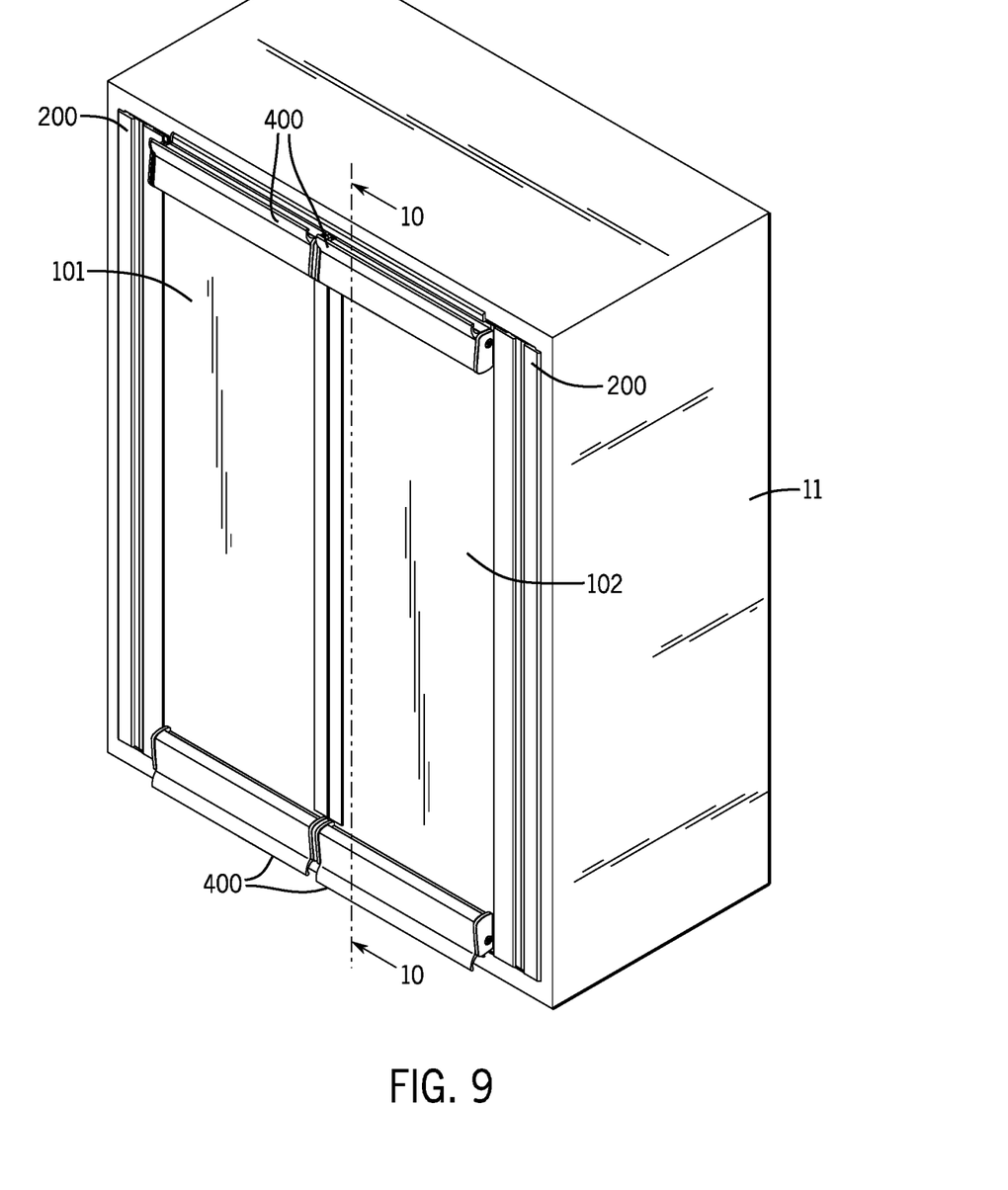
FIG. 9 is a perspective view of the cabinet with multiple doors secured by the latches.
Figure 10:
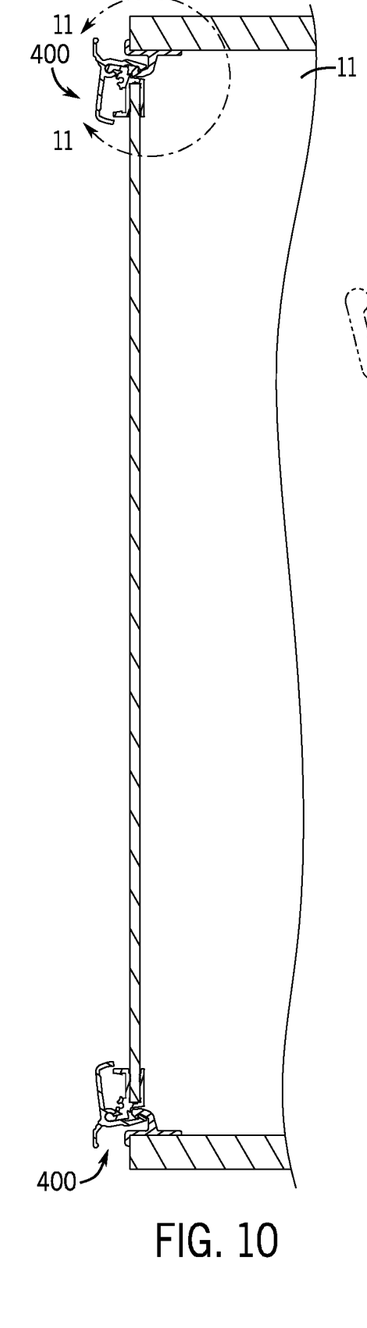
FIG. 10 is a sectional view of the cabinet with multiple doors secured by the latches.
Figure 11:
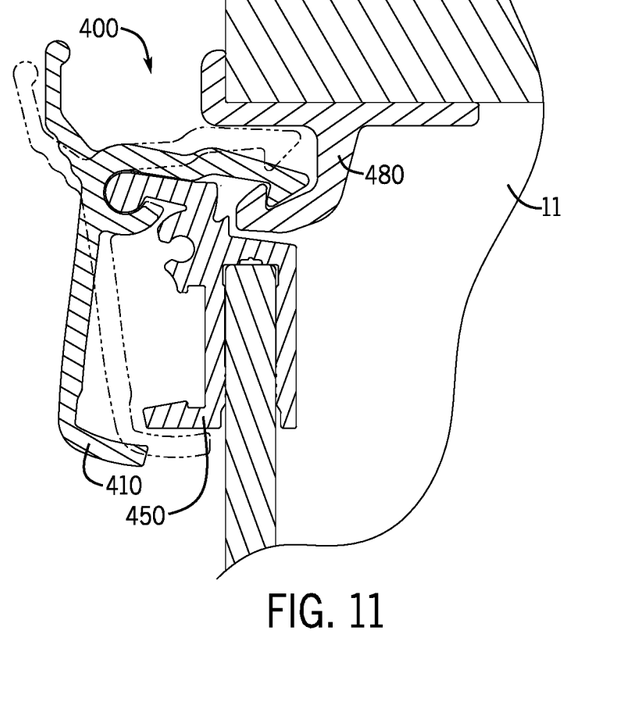
FIG. 11 is a sectional view of the cabinet with multiple doors secured by the latches.
Figure 12:
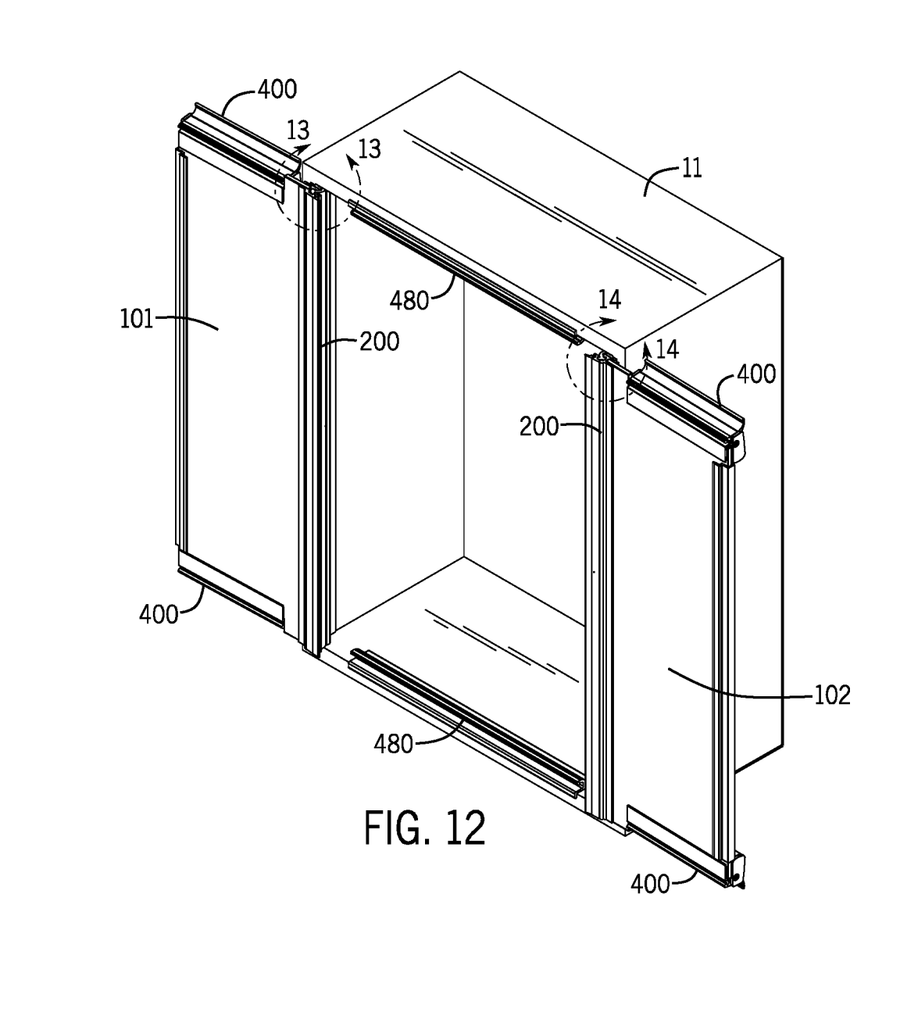
FIG. 12 is a perspective view of the cabinet with multiple doors, in an open position, secured by the latches.
Figure 13:
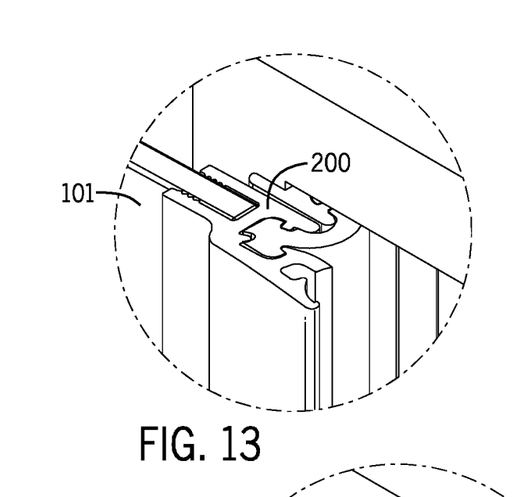
FIG. 13 is a close-up view of the hinge.
Figure 14:
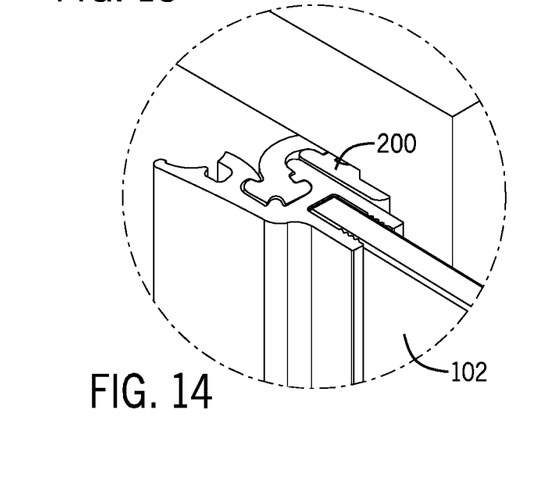
FIG. 14 is a close-up view of the hinge.

The latch 400 will now be described with reference to FIGS. 7-8. The latch 400 secures the door 100 in a closed position. The latch 400 includes a handle 410, a base 450, and a striker 480. When the door 100 is in the closed position, an inner surface 105 of the door 100 faces an interior of the cabinet 10.

The handle 410 and base 450 are mounted to the door 100, while the striker 480 is mounted to a wall of the cabinet 10. The handle 410 and base 450 move with the door 100, while the striker 480 remains stationary with respect to the cabinet 10. The latch 400 includes slam-closing functionality, i.e., pushing the door 100 to a closed position engages the latch 400 to secure the door 100 in the closed position. The latch 400 also includes one-handed opening operation, i.e., the user may grip any portion of the handle 410 with a single hand and actuate the handle 410 to release the latch 400 and permit the door 100 to open. Then, the user may pull on the handle 410 to open the door 100 to the cabinet 10, as the handle 410 moves with the door 100. The latch 400 resists both inward and outward forces on the door 100.

The handle 410 pivots or rotates relative to the base 450. The handle 410 is biased to the closed position by a biasing member. The base 450 mounts directly to the door 100, and the handle 410 is pivotally or rotatably mounted to the base 450.

The handle 410 forms a pawl tip 415. The pawl tip 415 lockingly engages with the striker 480 to secure the door 100 in a closed position. The pawl tip 415 is a distal end of a pawl arm 418.

The handle 410 includes the pawl tip 415 at a position approximately perpendicular of a pawl lever end 425. The handle 410 includes a central channel 435 between the pawl arm 418 and the pawl lever end 425. The central channel 435 forms a bearing surface that rotatably or pivotally engages to a base axle 458 of the base 450. The central channel 435 may be positioned at a junction of the pawl arm 418 and the pawl lever end 425. The handle 410 includes a handle end 440 for the user to grip and actuate. The pawl lever end 425 includes a stop 461 to prevent over-rotation of the handle 410. The stop portion 461 contacts an outer surface of the door 100 to stop the rotation of the handle 410.

The base 450 engages to the door 100 of the cabinet 10 and holds the handle 410 in a biased and pivoting engagement. The base 450 defines a groove 451 to receive and affix to a front leading edge of the door 100. The base 450 include a front member 455 and rear member 460 that forms the groove 451. Inner surface of the front member 455 and the rear member 460 may be lined with teeth to grab or hold to the door 100.

The base member 450 includes springs 453 that urge against an inner surface 427 of the pawl lever end 425. The springs 453 bias the pawl tip 415 towards the striker 480. The springs 453 urge the pawl tip 415 to lockingly engage to the striker 480. The springs 453 may include coil springs, leaf springs, elastic members, etc.

The base 450 forms the base axle 458. The central channel 435 of the handle 410 pivotally engages to the base axle 458. The handle 410 further includes the pawl tip 415 that lockingly engages with a catch 485 of the striker 480. The base axle 458 may be integral to the remainder of the base 450.

In order to latch the door 100 in the closed position, the door 100 is moved to the closed position. With reference to FIG. 8, an outer surface 419 of the pawl tip 415 presses against a front surface 487 of the striker 480, which causes the handle 410 to compress the springs 453. As the door 100 is further moved to the closed position and past the front surface 487, the pawl tip 415 will eventually seat into the catch 485 of the striker 480 when the door 100 is sufficiently closed. The force from the springs 453 holds the pawl tip 415 in the catch 485.

Figure 21:
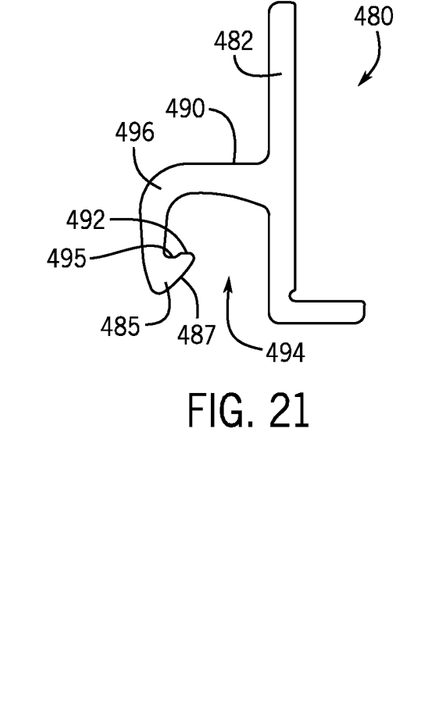
FIG. 21 is an end view of the striker.
Figure 22:
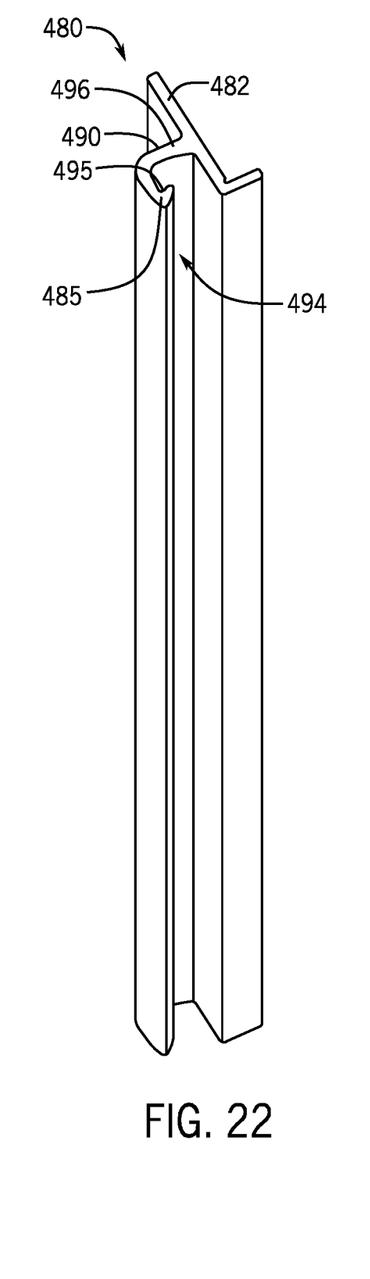
FIG. 22 is a perspective view of the striker.

The striker 480 is attached to the cabinet 10 along the perimeter of the opening of the cabinet 10. The striker 480 is shown in FIGS. 21 and 22. The striker 480 includes a base portion 482 to attach to the walls of the cabinet 10. The base portion 482 may be affixed or attached to an inner surface 82 of the wall 80 of the cabinet 10. The striker 480 includes an extending portion 490 that extends from the base portion 482 into the interior of the cabinet 10. The extending portion 490 transitions into the catch 485. The catch 485 is positioned interior to the walls of the cabinet 10. The catch 485 is spaced from the interior of the walls of the cabinet 10 by the extending portion 490. The catch 485 includes a locking surface 492 that is behind the front surface 487 of the catch 485. The locking surface 420 may substantially parallel to a width of the door 100 when the door is in the closed position.

In the closed position, the catch 485 is positioned between the pawl tip 415 and the opening of the cabinet 10, i.e., the catch 485 blocks the pawl tip 415 from moving in the opening direction of the door 110. The striker 480 includes an opening 494 between the base portion 482 and the catch 485. The opening 494 faces the same direction as an overall opening of the door 100. The opening 494 is positioned interior to the walls of the cabinet 10. The pawl tip 415 enters the opening 494 in order to engage the catch 485. The pawl tip 415 engages to the locking surface 492, which is on an inner side of the catch 485. The locking surface 492 is opposite from the front surface 487 of catch 485. In the closed position, the pawl tip 415 is behind the catch 485.

In order to secure the latch 400, the door 100 is moved to the closed position. The pawl tip 415 enters the opening 494, which is between the catch 484 of the striker 480 and the base portion 482 of the striker 480. The outer surface 419 of the pawl tip 415 may press against the front surface 487 of the striker 480, thus compressing the springs 453. After the pawl tip 415 enters the opening 494 sufficiently for the outer surface 419 of the pawl tip 415 to clear the front surface 487 of the striker 480, the handle 410 rotates or pivots under the bias of the springs 453, thus pivoting or rotating the pawl tip 415 inward, i.e., away from the walls of the cabinet. The pawl tip 415 pivots or rotates behind the front surface 487 of the striker 480. The bias of the springs 453 drives the pawl tip 415 against or into an angled locking region 495 of the catch 485, which is behind the front surface 487 of the striker catch 485. A locking surface 420 of the pawl tip 415 is biased against the locking surface 492 on an inner side of the catch 485. The bias of the springs 453 holds the pawl tip 415 against or into an angled locking region 495, which secures the door 100 closed relative to the cabinet 10. The locking surface 420 of the pawl tip 415 may be at a negative angle in order to securely hold the pawl tip 415 to the angled locking region 495. For example, the locking surface 420 of the pawl tip 415 may be at a −5 degree angle with respect to the locking surface 492.

When a force, such as a collision force from an object in the cabinet 10, is applied to a rear (inner) surface 105 of the door 100, the door 100 may tend to bow and pull its perimeter edges inward or centrally—i.e., the force urges the width of the door 100 to shorten. However, the positioning and shape of the catch 485 and the pawl tip 415 resists this force to prevent the door 100 from opening. When a force is applied to the door 100, the pawl tip 415 tightens against the catch 485. The force drives the pawl tip 415 against or into the angled locking region 495 formed by the locking surface 492 and a body 496 of the catch 485. The angled locking region 495 is behind the front surface 487 of the catch 485, thus the pawl tip 415 is pulled by the collision force into the angled locking region 495, which provide security to help prevent the door 100 from failing. The locking surface 420 of the pawl tip 415, at a negative angle, assists in driving the pawl tip 415 into the angled locking region 495.

The hinge 200 and the latch 400 may be used individually or together in a wide variety of different types and styles of cabinets. For example, FIGS. 9-13 show use of the hinge 200 and the latch 400 on a double-door cabinet 11, which includes a first door 101 opening to the left and a second door 102 opening to the right. In this aspect, the striker 480 is attached to both a bottom wall and a top wall of the cabinet 11. In this aspect, a single striker 480 on the bottom wall and the top wall is lockingly engaging with both of the handles 410 of both the door 101 and the door 102. In other aspects, multiple strikers 480 may be used.

Figure 15:
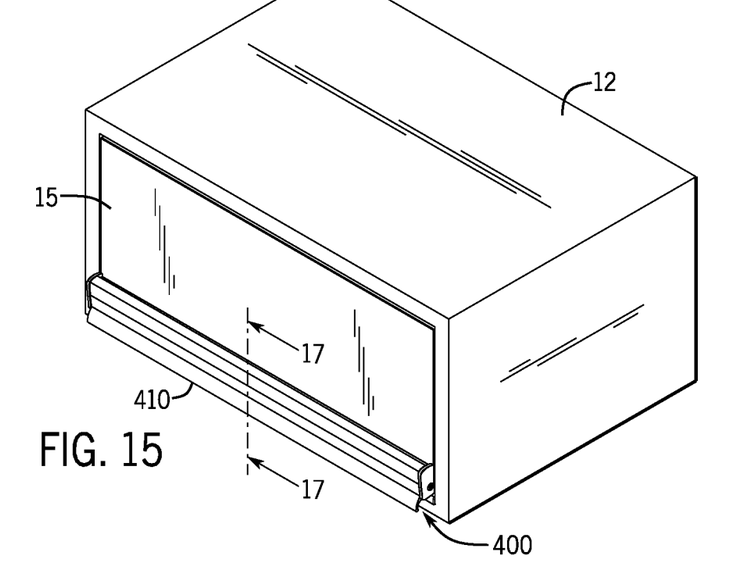
FIG. 15 is a perspective view of the drawer with the latch.
Figure 16:
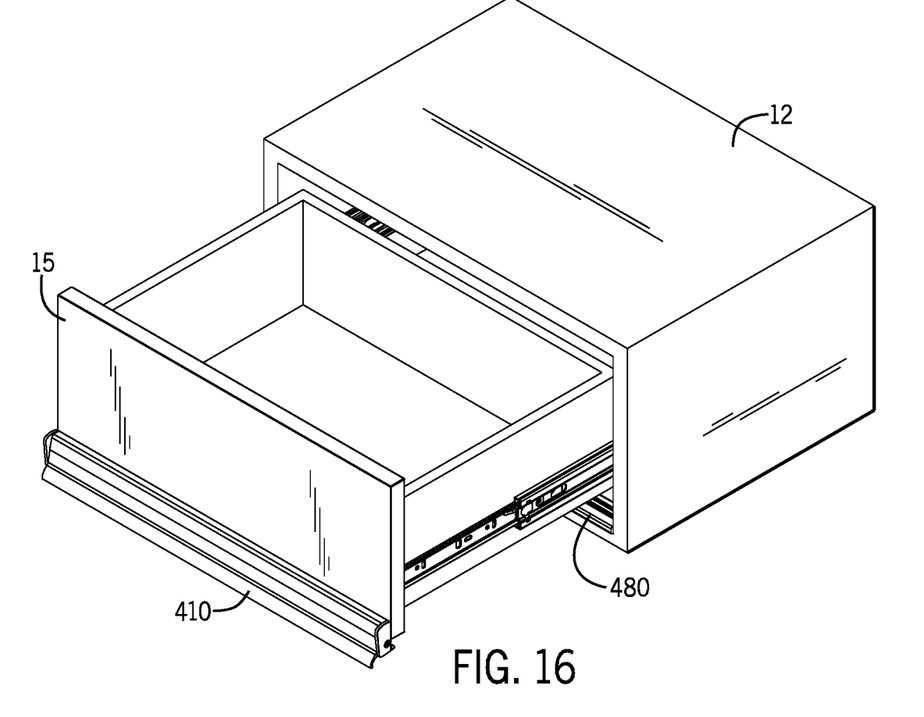
FIG. 16 is a perspective view of the drawer with the latch.
Figure 17:
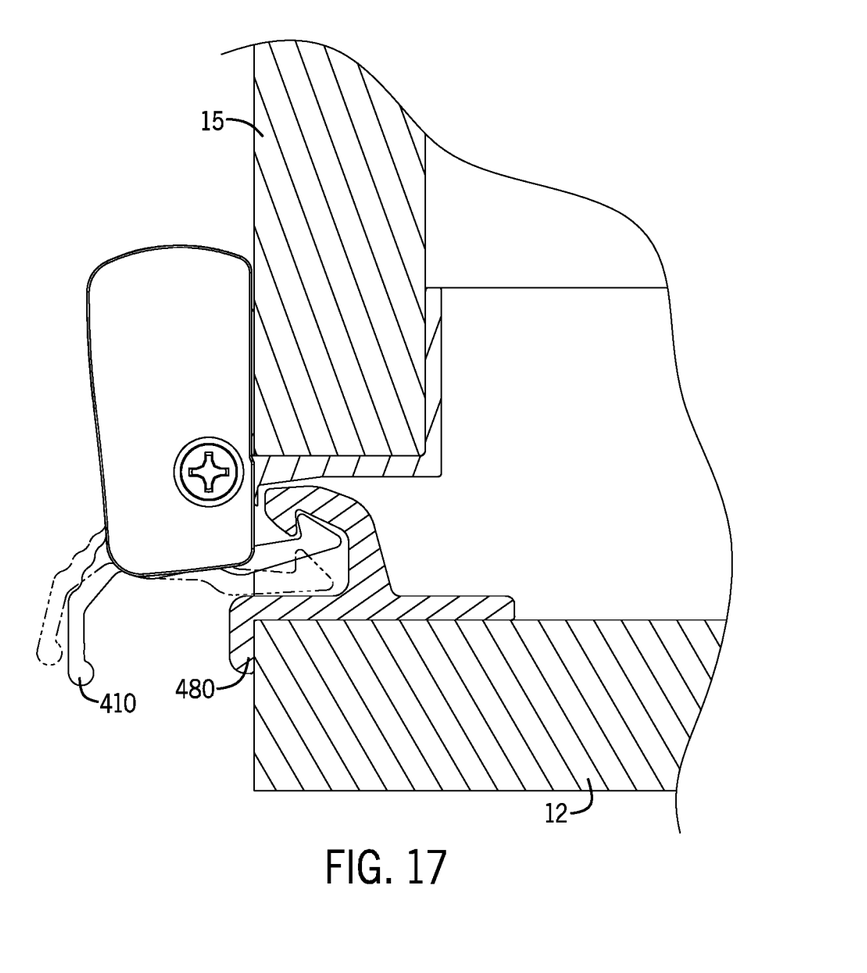
FIG. 17 is a sectional view of the drawer with the latch.

FIGS. 15-17 show use of the latch 400 used to secure a drawer 15 to a cabinet 12. In this aspect, the handle 410 is positioned on a lower front surface of the drawer 15. The striker 480 is poisoned on along a lower front edge of the cabinet 12.

Figure 18:
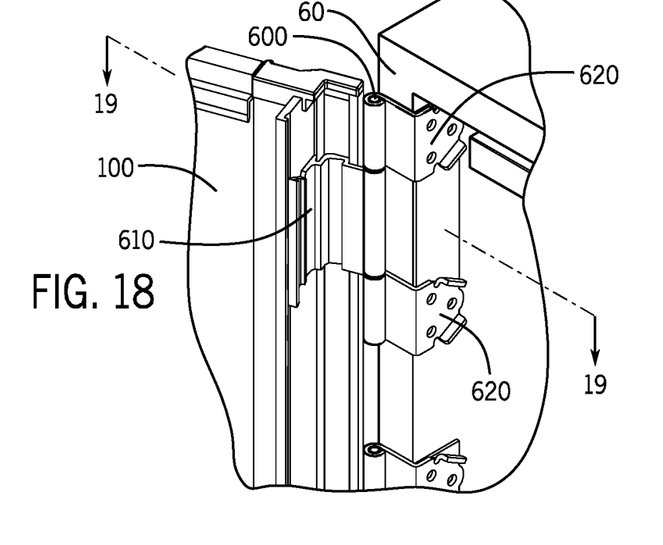
FIG. 18 is a perspective view of the door engaged to the cabinet via the hinge with the door in an open position.
Figure 19:
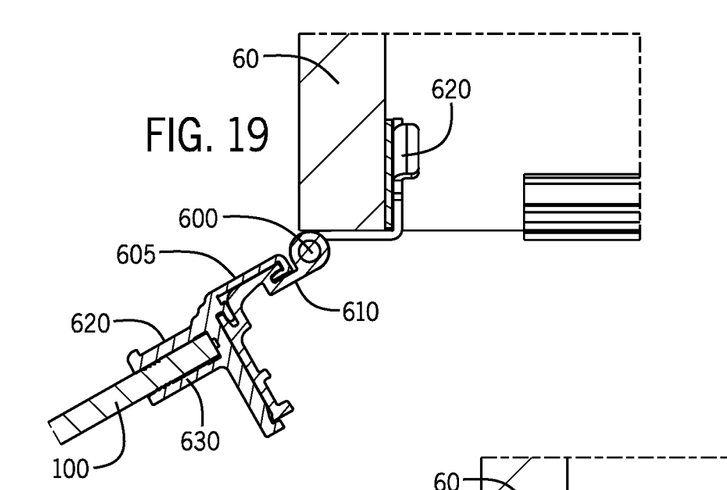
FIG. 19 is a sectional view of the door engaged to the cabinet via the hinge in the open position.
Figure 20:
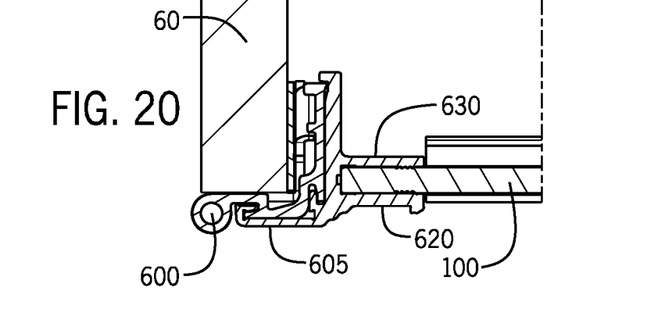
FIG. 20 is a sectional view of the door engaged to the cabinet via the hinge in a closed position.

With reference to FIGS. 18-20, the door 100 hingedly engages to the cabinet 10 via the hinge 600. The hinge 600 includes a door attachment 605 for connecting or attaching to the door 100. The door attachment 605 may be formed from a metal extrusion. The door attachment 605 includes a front wall 620 and a rear wall 630 that forms an opening or groove that receives and holds an edge of the door 100. In the aspect shown, the door attachment 605 is engaged with a central portion 610 of the hinge 600. The hinge 600 further includes lateral portions 620 that engage to a wall 60 of the cabinet 10. The hinge 600 is described in U.S. patent application Ser. No. 15/699,034, filed Sep. 8, 2017, which is hereby incorporated by reference in its entirety. The door attachment 605 and the central portion 610 engage or interlock with each other. In the aspect shown, the central portion 610 interlocks into a groove of the door attachment 605. The grooves may be formed as part of the extrusion used in making the door attachment 605.

The door 100 may be hingedly connected to the cabinet 10 by the hinge 200, the hinge 600, or any other suitable hinge. The hinge 200 and the hinge 600 are exemplary hinges that connect the door 100 to the cabinet 10 and provide opening and closing of the doors 100 and the cabinet 10.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed:

1. A latch in combination with a cabinet having a door, the door hingedly engaged to the cabinet, the latch comprising:
    a handle, the handle comprises a pawl tip;
    a base, the handle rotates relative to the base, the handle is biased to a closed position by at least one spring, the handle and the base are configured to mount to the door of the cabinet;
    a striker configured to mount to a wall of the cabinet, the striker comprising a base portion and a catch, wherein the catch is spaced from the base portion, wherein the striker includes an opening between the base portion and the catch, wherein at least a portion of the catch, having a locking surface, extends into the opening of the striker, wherein the catch includes a front surface, wherein the front surface faces a same direction as an opening of the cabinet, wherein the locking surface is behind the front surface of the catch; wherein the locking surface faces a rear of the cabinet;
    the pawl tip enters the opening of the striker and lockingly engages with the locking surface of the catch of the striker when the handle is in the closed position and the door is in a closed position;
    wherein in the closed position of the door, the catch is positioned between the pawl tip and the opening of the cabinet, and the catch blocks the pawl tip from moving in an opening direction of the door; and
    wherein the handle comprises a central channel between the pawl tip and a pawl lever end, the base forms a base axle, the central channel of the handle pivotally engages to the base axle such that the handle rotates relative to the base.

2. The latch in combination with the cabinet having the door, the door hingedly engaged to the cabinet, according to claim 1, wherein the striker further comprises an extending portion, wherein the extending portion extends from the base portion, and the extending portion transitions into the catch.

3. The latch in combination with the cabinet having the door, the door hingedly engaged to the cabinet, according to claim 1, the pawl tip enters the opening of the striker in order to lockingly engage with the locking surface of the catch, and the pawl tip rotates behind the front surface of the catch and lockingly engages with the locking surface of the catch when the handle is in the closed position and the door is in the closed position.

4. The latch in combination with the cabinet having the door, the door hingedly engaged to the cabinet, according to claim 1, wherein an angled locking region is formed by the locking surface and a body of the catch, and the angled locking region is behind the front surface of the catch.

5. The latch in combination with the cabinet having the door, the door hingedly engaged to the cabinet, according to claim 4, wherein the bias of the handle to the closed position by the at least one spring holds the pawl tip against or into the angled locking region.

6. The latch in combination with the cabinet having the door, the door hingedly engaged to the cabinet, according to claim 1, the pawl tip enters the opening in order to lockingly engage with the locking surface of the catch, and the locking surface is on an inner side of the catch.

7. A latch in combination with a cabinet, the latch comprising:
- a handle comprising a pawl arm approximately perpendicular to a pawl lever end of the handle, and a distal end of the pawl arm comprising a pawl tip;
- a base, the handle rotates relative to the base, the handle is biased to a closed position by at least one spring, and the handle and the base are configured to mount to a door of the cabinet, the handle and the base are sized to extend along substantially all of a closing side of the door of the cabinet;
- a striker configured to mount to a wall of the cabinet, the striker comprises a base portion and an extending portion, wherein the extending portion extends from the base portion of the striker into an interior of the cabinet, the extending portion transitions into a catch, wherein the catch is spaced from the base portion, wherein the striker includes an opening between the base portion and the catch, wherein the catch includes a locking surface and a front surface, wherein at least a portion of the catch, having the locking surface, extends into the opening of the striker, wherein the locking surface is behind the front surface of the catch;
- at least one spring urges against the pawl lever end and biases the pawl tip towards the striker; and
- the pawl tip is configured to enter the opening of the striker and to lockingly engage with the locking surface of the catch of the striker when the handle is in the closed position and the door is in a closed position, and the catch is positioned between the pawl tip and an opening of the cabinet when the handle is in the closed position and the door is in the closed position, and the catch blocks the pawl tip from moving in an opening direction of the door.

8. The latch in combination with the cabinet according to claim 7, wherein in the closed position of the door, the pawl tip is positioned between the catch and the opening of the striker.

9. The latch in combination with the cabinet according to claim 7, wherein the extending portion extends from the base portion into the interior of the cabinet, and the locking surface is on an inner side of the catch.

10. The latch in combination with the cabinet according to claim 7, wherein the pawl tip urges against the catch when a force is applied to a rear surface of the door.

11. A cabinet, comprising:
- a plurality of walls defining an interior with an opening;
- a door engaged to a first wall of the plurality of walls by a hinge;
- a latch comprising:
- a handle, the handle includes a pawl tip;
- a base, the handle rotates relative to the base, the handle is biased to a closed position by at least one spring, wherein the handle and the base are mounted to the door of the cabinet;
- a striker mounted to a second wall of the plurality of walls, the striker comprising a catch and a base portion, wherein the catch is spaced from an interior surface of the second wall, wherein the striker includes an opening between the base portion and the catch, wherein the catch includes a locking surface and a front surface, wherein at least a portion of the catch, having the locking surface, extends into the opening of the striker, wherein the front surface faces a same direction as the opening of the cabinet, wherein the locking surface is behind the front surface of the catch; and
- the pawl tip enters the opening of the striker and lockingly engages with the locking surface of the catch of the striker when the handle is in the closed position and the door is in a closed position.

12. The cabinet according to claim 11, wherein in the closed position of the door, the catch is positioned between the pawl tip and the opening of the cabinet, and the catch blocks the pawl tip from moving in an opening direction of the door.

13. The cabinet according to claim 11, wherein the catch includes an angled locking region that is formed by the locking surface and a body of the catch, wherein a force applied to an inner surface of the door forces the pawl tip against or into the angled locking region.

14. The cabinet according to claim 11, wherein the hinge comprises a door attachment having a front member and a rear member to receive and hold an edge of the door.

15. The cabinet according to claim 11, wherein the hinge comprises:
- a wall attachment to engage with the first wall of the cabinet, the wall attachment comprising a first receiving portion;
- a door attachment to engage with the door of the cabinet, the door attachment comprising a second receiving portion; and
- a rubber connector that joins with the first receiving portion of the wall attachment and the second receiving portion of the door attachment, wherein the rubber connector bends and flexes to provide a hinging movement of the door.

16. A cabinet, comprising:
- a plurality of walls defining an interior with an opening;
- a door engaged to a first wall of the plurality of walls by a hinge;
- a latch comprising:
- a handle, the handle includes a pawl tip;
- a base, the handle rotates relative to the base, the handle is biased to a closed position by at least one spring, wherein the handle and the base are mounted to the door of the cabinet;
- a striker mounted to a second wall of the plurality of walls, the striker comprising a catch and a base portion, wherein the catch is spaced from an interior surface of the second wall, wherein the striker includes an opening between the base portion and the catch, wherein the catch includes a locking surface and a front surface, wherein at least a portion of the catch, having the locking surface, extends into the opening of the striker, wherein the front surface faces a same direction as the opening of the cabinet, wherein the locking surface is behind the front surface of the catch; and
- the pawl tip enters the opening of the striker and lockingly engages with the locking surface of the catch of the striker when the handle is in the closed position and the door is in a closed position, wherein an extending portion extends from the base portion of the striker into the interior of the cabinet, the extending portion transitions into the catch, and the locking surface of the catch is on an inner side of the catch.

17. A cabinet, comprising:
a plurality of walls defining an interior with an opening;
a door engaged to a first wall of the plurality of walls by a hinge;
a latch comprising:
a handle, the handle includes a pawl tip;
a base, the handle rotates relative to the base, the handle is biased to a closed position by at least one spring, wherein the handle and the base are mounted to the door of the cabinet;
a striker mounted to a second wall of the plurality of walls, the striker comprising a catch and a base portion, wherein the catch is spaced from an interior surface of the second wall, wherein the striker includes an opening between the base portion and the catch, wherein the catch includes a locking surface and a front surface, wherein at least a portion of the catch, having the locking surface, extends into the opening of the striker, wherein the front surface faces a same direction as the opening of the cabinet, wherein the locking surface is behind the front surface of the catch; and
the pawl tip enters the opening of the striker and lockingly engages with the locking surface of the catch of the striker when the handle is in the closed position and the door is in a closed position, wherein the opening of the striker faces the same direction as the opening of the cabinet, and wherein the locking surface is on an inner side of the catch.

* * * * *